United States Patent
Kanno et al.

(10) Patent No.: US 10,020,537 B2
(45) Date of Patent: Jul. 10, 2018

(54) SULFIDE SOLID ELECTROLYTE MATERIAL, BATTERY, AND PRODUCING METHOD FOR SULFIDE SOLID ELECTROLYTE MATERIAL

(71) Applicants: TOKYO INSTITUTE OF TECHNOLOGY, Tokyo-to (JP); TOYOTA JIDOSHA KABUSHIKI KAISHA, Toyota-shi, Aichi-ken (JP)

(72) Inventors: Ryoji Kanno, Yokohama (JP); Masaaki Hirayama, Kawasaki (JP); Kota Suzuki, Yokohama (JP); Huang Wenze, Machida (JP)

(73) Assignees: TOKYO INSTITUTE OF TECHNOLOGY, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/426,311

(22) Filed: Feb. 7, 2017

(65) Prior Publication Data

US 2017/0229732 A1   Aug. 10, 2017

(30) Foreign Application Priority Data

Feb. 9, 2016 (JP) ................................ 2016-022942

(51) Int. Cl.
*H01M 10/0525* (2010.01)
*H01M 10/0562* (2010.01)
*H01M 10/058* (2010.01)
*C01B 17/22* (2006.01)
*H01M 10/052* (2010.01)

(52) U.S. Cl.
CPC ......... *H01M 10/0562* (2013.01); *C01B 17/22* (2013.01); *H01M 10/058* (2013.01); *H01M 10/0525* (2013.01); *C01P 2002/72* (2013.01); *H01M 10/052* (2013.01); *H01M 2300/0068* (2013.01)

(58) Field of Classification Search
CPC ......... H01M 10/0525; H01M 10/0562; H01M 10/058; H01M 2300/0068
See application file for complete search history.

(56) References Cited

U.S. PATENT DOCUMENTS

2011/0318651 A1   12/2011   Leitner et al.
2015/0221978 A1 *  8/2015   Murota ................ H01M 4/505
                                            429/320

FOREIGN PATENT DOCUMENTS

JP       2013-546114 A   12/2013

* cited by examiner

*Primary Examiner* — Brittany Raymond
(74) *Attorney, Agent, or Firm* — Oliff PLC

(57) ABSTRACT

A main object of the present disclosure is to provide a sulfide solid electrolyte material with favorable Li ion conductivity. To achieve the above object, the present disclosure provides a sulfide solid electrolyte material comprising a composition of $Li_{(4+x)}Al_xSi_{(1-x)}S_4$ (0<x<1), and having a peak at a position of $2\theta=25.19°\pm1.00°$, $29.62°\pm1.00°$, $30.97°\pm1.00°$ in X-ray diffraction measurement using a CuKα ray.

6 Claims, 5 Drawing Sheets

US 10,020,537 B2

SULFIDE SOLID ELECTROLYTE MATERIAL, BATTERY, AND PRODUCING METHOD FOR SULFIDE SOLID ELECTROLYTE MATERIAL

TECHNICAL FIELD

The present disclosure relates to a sulfide solid electrolyte material with favorable Li ion conductivity.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has presently drawn attention from the viewpoint of a high energy density among various kinds of batteries.

Liquid electrolyte containing a flammable organic solvent is used for a presently commercialized lithium battery, so that the installation of a safety device for restraining temperature rise during a short circuit and the device for preventing the short circuit are necessary therefor. On the contrary, with a lithium battery, namely a battery all-solidified by replacing the liquid electrolyte with a solid electrolyte layer, the simplification of the safety device may be achieved since the flammable organic solvent is not used in the battery. A sulfide solid electrolyte material has been known as the solid electrolyte material to be used for an all solid lithium battery. For example, $Li_2S$—$SiS_2$—$Al_2S_3$ is exemplified as a sulfide solid electrolyte material in Claim 4 of Patent Literature 1.

CITATION LIST

Patent Literature

Patent Literature 1: Japanese Unexamined Patent Publication No. 2013-546114

SUMMARY OF DISCLOSURE

Technical Problem

From the viewpoint of heightening output of a battery, a solid electrolyte material with favorable Li ion conductivity has been demanded. The present disclosure is made in view of the actual circumstances, and the main object thereof is to provide a sulfide solid electrolyte material with favorable Li ion conductivity.

Solution to Problem

To achieve the above object, the present disclosure provides a sulfide solid electrolyte material comprising a composition of $Li_{(4+x)}Al_xSi_{(1-x)}S_4$ (0<x<1), and having a peak at a position of $2\theta=25.19°\pm1.00°$, $29.62°\pm1.00°$, $30.97°\pm1.00°$ in X-ray diffraction measurement using a CuKα ray.

According to the present disclosure, providing the crystal phase having the specific peak allows a sulfide solid electrolyte material with favorable Li ion conductivity.

Also, the present disclosure provides a battery comprising a cathode active material layer containing a cathode active material, an anode active material layer containing an anode active material, and an electrolyte layer formed between the cathode active material layer and the anode active material layer, wherein at least one of the cathode active material layer, the anode active material layer, and the electrolyte layer contains the above-described sulfide solid electrolyte material.

According to the present disclosure, usage of the above-described sulfide solid electrolyte material allows a battery with high output.

Also, the present disclosure provides a producing method for the above-described sulfide solid electrolyte material, the method comprising: a preparing step of preparing a raw material composition containing a constituent of the sulfide solid electrolyte material, and a heating and quenching step of heating and quenching the raw material composition.

According to the present disclosure, heating and quenching a raw material composition allows a sulfide solid electrolyte material with favorable Li ion conductivity to be obtained.

Advantageous Effects of Disclosure

The sulfide solid electrolyte material of the present disclosure exhibits favorable Li ion conductivity as its effect.

DESCRIPTION OF EMBODIMENTS

Figure 1:
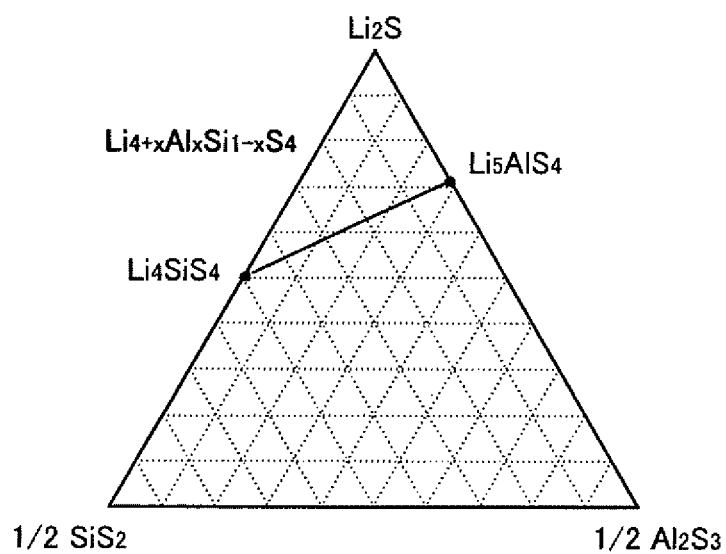
FIG. 1 is a ternary diagram exemplifying the compositional region of the sulfide solid electrolyte material of the present disclosure.

The sulfide solid electrolyte material, the battery, and the producing method for the sulfide solid electrolyte material of the present disclosure are hereinafter described in details.

A. Sulfide Solid Electrolyte Material

First, the sulfide solid electrolyte material of the present disclosure is described. The sulfide solid electrolyte material of the present disclosure comprises a composition of $Li_{(4+x)}Al_xSi_{(1-x)}S_4$ (0<x<1), and has a peak at a position of $2\theta=25.19°\pm1.00°$, $29.62°\pm1.00°$, $30.97°\pm1.00°$ in X-ray diffraction measurement using a CuKα ray.

According to the present disclosure, providing with the crystal phase having the specific peak allows the sulfide solid electrolyte material with favorable Li ion conductivity. Also, the crystal phase usually comprises a Li element, an Al element, a Si element and a S element, and thus exhibits the following advantages. For example, a sulfide solid electrolyte material of LiGePS series has been known; however, problem thereof is such that the reduction resistance of a Ge element is relatively low and thus high in cost, and that a P element is low in chemical stability (such as high in volatility) and thus the heat treatment at a high temperature is difficult. There is a sufficient amount of source for an Al element and a Si element and thus the advantage is the low cost; the advantage of a Si element is its high chemical stability. Accordingly, for example, a sulfide solid electrolyte material with high chemical stability at low cost may be achieved by using an Al element and a Si element instead of a Ge element and a P element.

The sulfide solid electrolyte material of the present disclosure is provided with a crystal phase having a peak at the specific position in X-ray diffraction measurement. This crystal phase is a crystal phase of Argyrodite structure. It may depend on the crystallinity of the sulfide solid electrolyte material, but the crystal phase usually has a characteristic peak at $2\theta=15.34°\pm1.00°$, $17.74°\pm1.00°$, $25.19°\pm1.00°$, $29.62°\pm1.00°$, $30.97°\pm1.00°$, $44.37°\pm1.00°$, $47.22°\pm1.00°$, and $51.70°\pm1.00°$. Also, if the peaks with relatively low intensity are also included, the crystal phase usually has a characteristic peak at $2\theta=54.26°\pm1.00°$, $58.35°\pm1.00°$, $60.72°\pm1.00°$, $61.50°\pm1.00°$, $70.46°\pm1.00°$, and $72.61°\pm1.00°$ as well. Incidentally, in these peak positions, the crystal lattice is slightly changed in accordance with factors such as the material composition; thus the range of $\pm1.00°$ is set. Each peak position may be in a range of $\pm0.50°$, and may be in a range of $\pm0.30°$.

The sulfide solid electrolyte material of the present disclosure preferably contains the crystal phase as the main constituent. The proportion of the crystal phase with respect to the whole crystal phases in the sulfide solid electrolyte material is: 50 weight % or more for example, preferably 70 weight % or more, and more preferably 90 weight % or more. The proportion of the crystal phase may be measured by synchrotron XRD for example.

The sulfide solid electrolyte material of the present disclosure usually has a composition of $Li_{(4+x)}Al_xSi_{(1-x)}S_4$ (0<x<1). This composition corresponds to the solid liquid composition of $Li_4SiS_4$ and $Li_5AlS_4$. In other words, this composition corresponds to a composition on the tie-line of $Li_4SiS_4$ and $Li_5AlS_4$, as shown in FIG. 1:

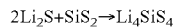

$$2Li_2S+SiS_2 \rightarrow Li_4SiS_4$$

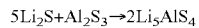

$$5Li_2S+Al_2S_3 \rightarrow 2Li_5AlS_4$$

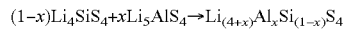

$$(1-x)Li_4SiS_4+xLi_5AlS_4 \rightarrow Li_{(4+x)}Al_xSi_{(1-x)}S_4$$

Also, "x" in $Li_{(4+x)}Al_xSi_{(1-x)}S_4$ is usually larger than 0, may be 0.01 or more, may be 0.05 or more, and may be 0.08 or more. Meanwhile, the "x" is usually smaller than 1, may be 0.7 or less, may be 0.5 or less, and may be 0.3 or less.

The sulfide solid electrolyte material of the present disclosure is preferably high in Li ion conductivity. The Li ion conductivity of the sulfide solid electrolyte material at 25° C. is preferably $1\times10^{-4}$ S/cm or more for example. Also, the shape of the sulfide solid electrolyte material of the present disclosure is not particularly limited, and examples thereof may include a granular shape. Further, the average particle diameter ($D_{50}$) of the sulfide solid electrolyte material is preferably in a range of 0.1 μm to 50 μm for example.

The sulfide solid electrolyte material of the present disclosure has favorable Li ion conductivity, so as to apply for an arbitrary use that requires Li ion conductivity. Above all, the sulfide solid electrolyte material of the present disclosure is preferably used for a battery. The reason therefor is to greatly contribute to heightening output of a battery. Also, a producing method for the sulfide solid electrolyte material of the present disclosure is described in "C. Producing method for sulfide solid electrolyte material" later in details.

B. Battery

Figure 2:
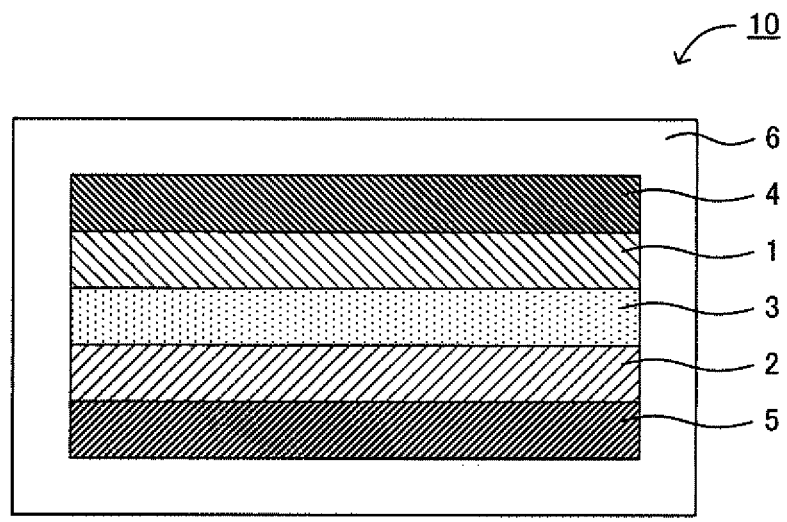
FIG. 2 is a schematic cross sectional view illustrating an example of the battery of the present disclosure.

Next, the battery of the present disclosure is described. FIG. 2 is a schematic cross sectional view illustrating an example of the battery of the present disclosure. Battery 10 in FIG. 2 comprises cathode active material layer 1 containing a cathode active material, anode active material layer 2 containing an anode active material, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. The present disclosure features the configuration that at least one of cathode active material layer 1, anode active material layer 2, and electrolyte layer 3 contains the sulfide solid electrolyte material described in "A. Sulfide solid electrolyte material" above.

According to the present disclosure, usage of the above-described sulfide solid electrolyte material allows a battery with high output.

The battery of the present disclosure is hereinafter described in each constitution.

1. Cathode Active Material Layer

The cathode active material layer in the present disclosure is a layer containing at least a cathode active material, and may contain at least one of a solid electrolyte material, a conductive material, and a binder as required. In particular, in the present disclosure, preferably, the cathode active material layer contains a solid electrolyte material, and the solid electrolyte material is the above-described sulfide solid electrolyte material. The proportion of the sulfide solid electrolyte material to be contained in the cathode active material varies in accordance with the kind of the battery; however, is in a range of 0.1 volume % to 80 volume % for example, preferably in a range of 1 volume % to 60 volume %, and more preferably in a range of 10 volume % to 50 volume %. Also, examples of the cathode active material may include $LiCoO_2$, $LiMnO_2$, $Li_2NiMn_3O_8$, $LiVO_2$, $LiCrO_2$, $LiFePO_4$, $LiCoPO_4$, $LiNiO_2$, and $LiNi_{1/3}Co_{1/3}Mn_{1/3}O_2$.

The cathode active material layer may further contain a conductive material. The conductivity in the cathode active material layer may be improved by adding a conductive material. Examples of the conductive material may include acetylene black, Ketjen black, and carbon fiber. Also, the cathode active material layer may contain a binder. Examples of the kind of the binder may include a binder containing fluoride such as polyvinylidene fluoride (PVDF). Also, the thickness of the cathode active material layer is preferably in a range of 0.1 μm to 1000 μm for example.

2. Anode Active Material Layer

The anode active material layer in the present disclosure is a layer containing at least an anode active material, and may contain at least one of a solid electrolyte material, a conductive material and a binder as required. In particular, in the present disclosure, preferably, the anode active material layer contains a solid electrolyte material, and the solid electrolyte material is the above-described sulfide solid electrolyte material. The proportion of the sulfide solid electrolyte material to be contained in the anode active material layer varies in accordance with the kind of the battery; however, is in a range of 0.1 volume % to 80 volume % for example, preferably in a range of 1 volume % to 60 volume %, and more preferably in a range of 10 volume % to 50 volume %. Also, examples of the anode active material may include a metal active material and a carbon active material. Examples of the metal active material may include In, Al, Si, and Sn. On the other hand, examples of the carbon active material may include mesocarbon microbeads (MCMB), highly oriented pyrolytic graphite (HOPG), hard carbon and soft carbon.

Incidentally, the conductive material and the binder to be used for the anode active material layer are the same as in the case of the above-described cathode active material layer. Also, the thickness of the anode active material layer is preferably in a range of 0.1 μm to 1000 μm for example.

3. Electrolyte Layer

The electrolyte layer in the present disclosure is a layer formed between a cathode active material layer and an anode active material layer. The electrolyte layer is not particularly limited if it is an ion-conductive layer, but is preferably a solid electrolyte layer comprising a solid electrolyte material. The reason therefor is to obtain a battery with higher safety compared to a battery utilizing a liquid electrolyte. Further, in the present disclosure, the solid electrolyte layer preferably contains the above-described sulfide solid electrolyte material. The proportion of the sulfide solid electrolyte material to be contained in the solid electrolyte layer is: in a range of 10 volume % to 100 volume % for example, and preferably in a range of 50 volume % to 100 volume %. The thickness of the solid electrolyte layer is in a range of 0.1 μm to 1000 μm for example. Also, examples of the forming method for the solid electrolyte layer may include a method such that a solid electrolyte material is compressed and formed thereto. Incidentally, the electrolyte layer in the present disclosure may be a layer comprising a liquid electrolyte.

4. Other Constitutions

The battery of the present disclosure comprises at least the above-described cathode active material layer, electrolyte layer, and anode active material layer; and further, usually comprises a cathode current collector for collecting currents of the cathode active material layer, and an anode current collector for collecting currents of the anode active material layer. Examples of the material for the cathode current collector may include SUS, aluminum, nickel, iron, titanium, and carbon. On the other hand, examples of the material for the anode current collector may include SUS, copper, nickel, and carbon. Also, forms such as the thickness and the shape of the cathode current collector and the anode current collector are preferably appropriately selected in accordance with factors such as the use of the battery. Also, a battery case for a general battery may be used for the battery case to be used for the present disclosure; example thereof may include a battery case made of SUS.

5. Battery

The battery of the present disclosure may be a primary battery and may be a secondary battery, but preferably a secondary battery among them. The reason therefor is to be repeatedly charged and discharged and be useful as a car-mounted battery, for example. Examples of the shape of the battery of the present disclosure may include a coin shape, a laminate shape, a cylindrical shape, and a rectangular shape. Also, the producing method for the battery of the present disclosure is not particularly limited if it allows the above-described battery to be obtained; the same method as the producing method for a general battery may be used. For example, if the battery of the present disclosure is an all solid battery, an example of the producing method therefor is such that the material for the cathode active material layer, the material for the solid electrolyte layer, and the material for the anode active material layer are pressed sequentially so as to produce a power generating element, thereafter store the power generating element inside a battery case and then crimp the battery case.

C. Producing Method for Sulfide Solid Electrolyte Material

Next, the producing method for the sulfide solid electrolyte material of the present disclosure is described. The producing method for a sulfide solid electrolyte material of the present disclosure is a producing method for the above-described sulfide solid electrolyte material; the method comprises a preparing step of preparing a raw material composition containing a constituent of the sulfide solid electrolyte material, and a heating and quenching step of heating and quenching the raw material composition.

Figure 3:
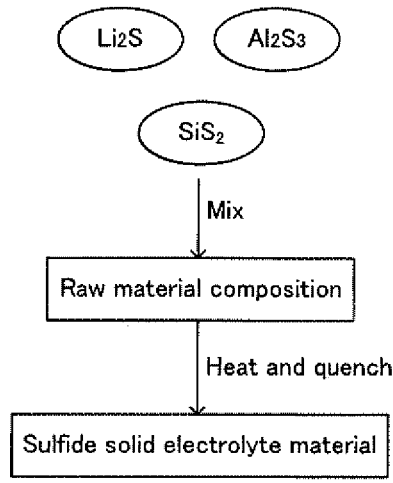
FIG. 3 is an explanatory diagram showing an example of the producing method for the sulfide solid electrolyte material of the present disclosure.

FIG. 3 is an explanatory diagram showing an example of the producing method for the sulfide solid electrolyte material of the present disclosure. In FIG. 3, first, a raw material composition is prepared by mixing $Li_2S$, $P_2S_5$, and $Al_2S_3$. On this occasion, the raw material composition is produced preferably under an inert gas atmosphere to prevent the raw material composition from being deteriorated by moisture in the air. Next, a sulfide solid electrolyte material is obtained by heating and quenching the raw material composition.

According to the present disclosure, the raw material composition is heated and quenched, so that a sulfide solid electrolyte material with favorable Li ion conductivity may be obtained.

The producing method for the sulfide solid electrolyte material of the present disclosure is hereinafter descried in each step.

1. Preparing Step

The preparing step in the present disclosure is a step of preparing a raw material composition containing a constituent of the sulfide solid electrolyte material.

The raw material composition in the present disclosure contains a Li element, an Al element, a Si element, and a S element. Examples of the raw material containing a Li element may include a sulfide of Li. Specific examples of the sulfide of Li may include $Li_2S$. Examples of the raw material containing an Al element may include a simple substance of Al and a sulfide of Al. Specific examples of the sulfide of Al may include $Al_2S_3$. Examples of the raw material containing a Si element may include a simple substance of Si and a sulfide of Si. Specific examples of the sulfide of Si may include $SiS_2$.

In the present disclosure, the raw material composition is obtained by mixing each raw material. The proportion of each raw material is preferably appropriately adjusted by considering the composition of the intended sulfide solid electrolyte material. The method for mixing the raw material is not particularly limited, but a method such as mixing while crushing the raw material is preferable. The reason therefor is to obtain a more uniform raw material composition. Examples of the method of mixing while crushing the raw material may include a vibration mill.

2. Heating and Quenching Step

The heating and quenching step in the present disclosure is a step of heating and quenching the raw material composition. The crystal phase having Argyrodite structure may be fixed by quenching.

The heating temperature is not particularly limited if it allows the desired sulfide solid electrolyte material to be obtained; however, is 600° C. or more for example, may be 700° C. or more, and may be 800° C. or more. Meanwhile, the heating temperature is 1200° C. or less for example, may be 1100° C. or less, and may be 1000° C. or less. Also, the heating time is not particularly limited if it allows the desired sulfide solid electrolyte material to be obtained; however, is 30 minutes or more for example, may be 1 hour or more, and may be 5 hour or more. Meanwhile, the heating time is 100 hours or less for example, and may be 70 hours or less. Also, the heating atmosphere is preferably in vacuum or under an inert gas atmosphere from the viewpoint of preventing oxidization. Examples of the heating method may include a method using a burning furnace.

On the other hand, cooling speed during quenching is 500° C./minute or more for example, and preferably 700° C./minute or more. Also, by quenching, it is preferable to cool down to 100° C. or less for example and to 50° C. or less above all. The cooling method to be used is usually such that the heated object is directly or indirectly contacted with a refrigerant. Specific examples thereof may include a method such that the container with the heated object inside is contacted with liquid such as water and ice, and a method such that the heated object is contacted with a rotating metal roll.

Incidentally, the present disclosure is not limited to the embodiments. The embodiments are exemplification, and any is included in the technical scope of the present disclosure if it has substantially the same constitution as the technical idea described in the claim of the present disclosure and offers similar operation and effect thereto.

EXAMPLES

The present disclosure is hereinafter described in more details with reference to Examples.

Example 1-1

Lithium sulfide ($Li_2S$), silicon sulfide ($SiS_2$), and aluminum sulfide ($Al_2S_3$) were used as the starting raw materials. Powders of these were mixed in a glove box under an argon atmosphere so as to be the composition of $Li_{4.1}Al_{0.1}Si_{0.9}S_4$, to obtain a raw material composition. Next, the obtained raw material composition was crushed by a vibration mill. Used vibration mill was TI-100 manufactured by Cosmic Mechanical Technology Co., Ltd. In specific, 2 g of the raw material composition and a vibrator made of alumina were put into a 10 mL pot and subjected to the treatment at revolution number 370 rpm for 30 minutes.

Next, the obtained powder was put into the carbon-coated quartz tube and vacuum sealed. The pressure of the vacuum sealed quartz tube was approximately 30 Pa. Next, the quartz tube was placed in a burning furnace, heated at 900° C. for 1 hour, and thereafter projected into ice water to quench. Thereby, a sulfide solid electrolyte material having the composition of $Li_{4.1}Al_{0.1}Si_{0.9}S_4$ was obtained. Incidentally, this composition corresponds to a composition of "x"=0.1 in $Li_{(4+x)}Al_xSi_{(1-x)}S_4$.

Example 1-2

A sulfide solid electrolyte material was obtained in the same manner as in Example 1-1 except that the heating temperature was changed to 950° C.

Example 1-3

A sulfide solid electrolyte material was obtained in the same manner as in Example 1-1 except that the heating temperature was changed to 1000° C.

Example 1-4

A sulfide solid electrolyte material was obtained in the same manner as in Example 1-1 except that the heating time was changed to 5 hours.

Example 1-5

A sulfide solid electrolyte material was obtained in the same manner as in Example 1-4 except that the heating temperature was changed to 950° C.

Example 1-6

A sulfide solid electrolyte material was obtained in the same manner as in Example 1-4 except that the heating temperature was changed to 1000° C.

Example 2

A sulfide solid electrolyte material was obtained in the same manner as in Example 1-1 except that the composition was changed to be $Li_{4.08}Al_{0.08}Si_{0.92}S_4$ (x=0.08) and the heating conditions were changed to 750° C. and 1 hour.

Comparative Example 1-1

A sulfide solid electrolyte material having a composition of $Li_{4.4}Al_{0.4}Si_{0.6}S_4$ (x=0.4) was produced by a solid phase method. First, in the same manner as in Example 1-1, the raw material composition was crushed by the vibration mill. Next, the obtained powder was pressed at 20 MPa to forma pellet, and the obtained pellet was put into a carbon-coated quartz tube and vacuum sealed. The pressure of the vacuum sealed quartz tube was approximately 30 Pa. Next, the quartz tube was placed in a burning furnace, the temperature was rose to 400° C. taking 3 hours, heated at 400° C. for 8 hours, and then naturally cooled down. The obtained test sample was crushed by an agate motor, put into the carbon-coated quartz tube again and vacuum sealed. Next, the quartz tube was placed in a burning furnace, the temperature was rose to 550° C. taking 3 hours, heated at 550° C. for 8 hours, and then naturally cooled down. Thereby, the sulfide solid electrolyte material was obtained.

Comparative Examples 1-2 and 1-3

A sulfide solid electrolyte material was obtained in the same manner as in Comparative Example 1-1 except that the value of "x" was changed to "x"=0.5 and 0.6.

Comparative Examples 2 and 3

Figure 4:
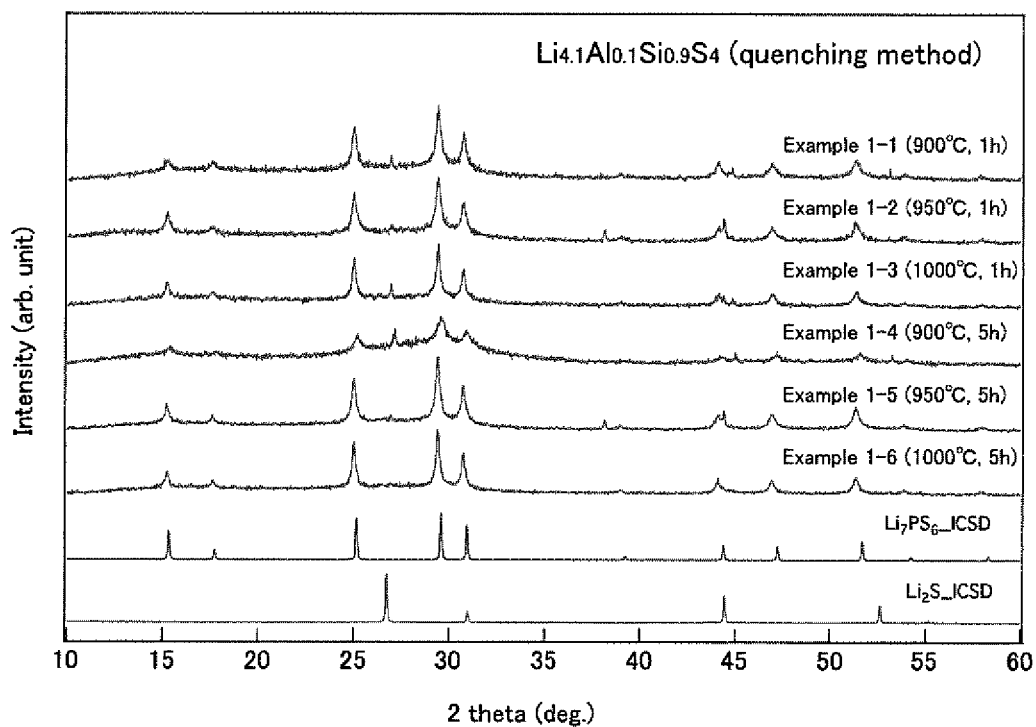
FIG. 4 is the result of XRD measurement for the sulfide solid electrolyte material obtained in Examples 1-1 to 1-6.

Used for Comparative Examples 2 and 3 were $Li_4SiS_4$ (x=0) and $Li_5AlS_4$ (x=1) respectively.
[Evaluation]
(XRD Measurement using a CuKα Ray)
X-ray diffraction (XRD) measurement was conducted for the sulfide solid electrolyte material obtained in Examples 1-1 to 1-6. The XRD measurement was conducted under the conditions of an inert atmosphere and using CuKα ray. The result is shown in FIG. 4. As shown in FIG. 4, in Example 1-1, peaks appeared at the position in the vicinity of each 2θ=15.34°, 17.74°, 25.19°, 29.62°, 30.97°, 44.37°, 47.22°, and 51.70°. Also, these peaks were about the same as the peaks of $Li_7PS_6$ having Argyrodite structure in ICSD (Inorganic Crystal Structure Database). Accordingly, it was confirmed that the sulfide solid electrolyte material obtained in Example 1-1 was provided with the crystal phase having Argyrodite structure. Also in Examples 1-2 to 1-6, the peaks appeared in the similar positions to those in Example 1-1; thus, it was confirmed that these sulfide solid electrolyte materials were provided with the crystal phase having Argyrodite structure. Incidentally, in Examples 1-1 to 1-6, although the peak of $Li_2S$ was slightly confirmed in the vicinity of 2θ=27°, the crystal phase having Argyrodite structure was produced in almost a single phase.

Figure 5:
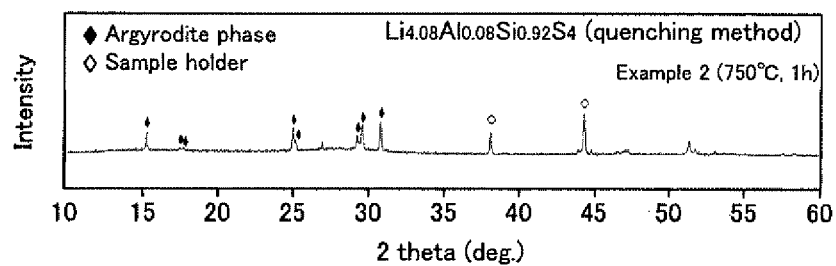
FIG. 5 is the result of XRD measurement for the sulfide solid electrolyte material obtained in Example 2.

Also, the XRD measurement was conducted for the sulfide solid electrolyte material obtained in Example 2. The result is shown in FIG. 5. As shown in FIG. 5, also in Example 2, the peaks appeared in the similar positions to those in Example 1-1; thus, it was confirmed that the sulfide solid electrolyte material was provided with the crystal phase having Argyrodite structure. Incidentally, in Example 2, two peaks deriving from the sample holder were confirmed; however, these peaks were not the peaks of the sulfide solid electrolyte material.

Figure 6:
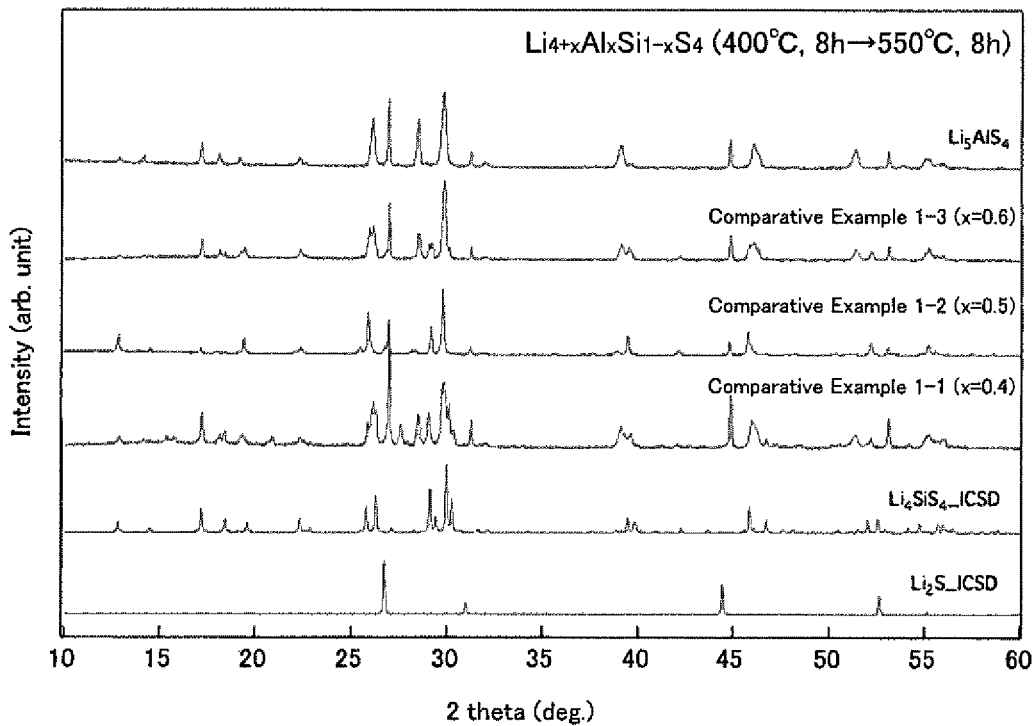
FIG. 6 is the result of XRD measurement for the sulfide solid electrolyte material obtained in Comparative Examples 1-1 to 1-3.

Also, the XRD measurement was conducted for the sulfide solid electrolyte material obtained in Comparative Examples 1-1 to 1-3. The result is shown in FIG. 6. As shown in FIG. 6, in Comparative Examples 1-1 to 1-3, the peaks of the crystal phase having Argyrodite structure did not appear although the peaks of $Li_2S$, $Li_4SiS_4$ and $Li_5AlS_4$ appeared. From these results, it was suggested that quenching was important for producing the crystal phase having Argyrodite structure.

(Synchrotron XRD Measurement)

Figure 7:
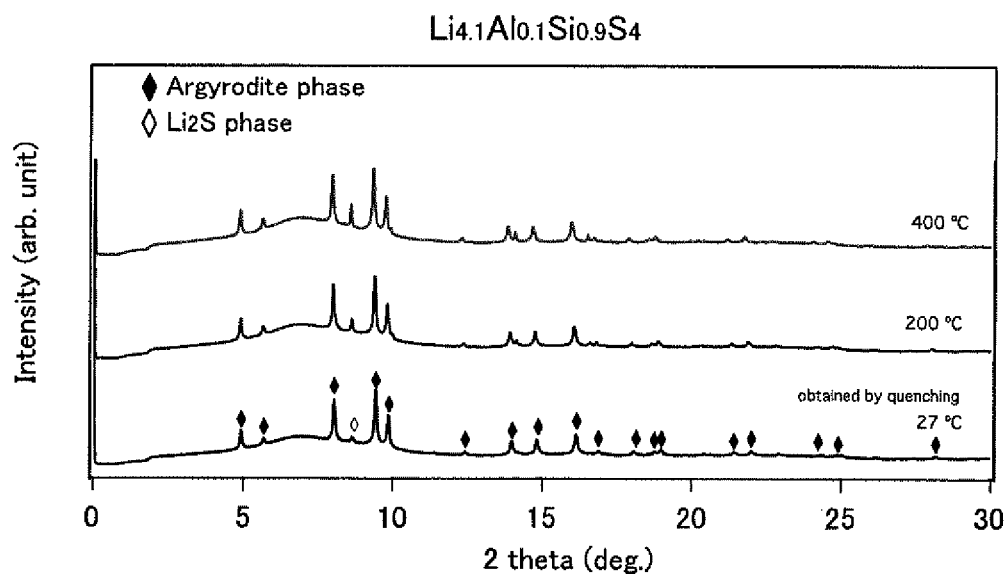
FIG. 7 is the result of synchrotron XRD measurement for the sulfide solid electrolyte material obtained in Example 1-1.
Figure 8:
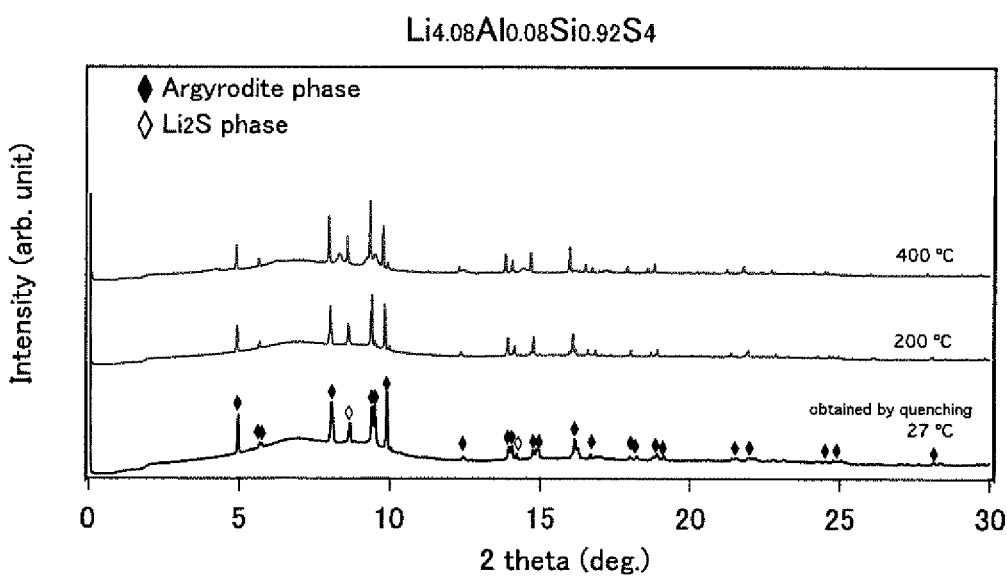
FIG. 8 is the result of synchrotron XRD measurement for the sulfide solid electrolyte material obtained in Example 2.

A synchrotron XRD measurement was conducted for the sulfide solid electrolyte material obtained in Example 1-1 and Example 2. The synchrotron XRD is a measuring method using a synchrotron radiation light (an electromagnetic wave generated at the time the straight advancing electron at nearly light speed is changed its advancing direction). The synchrotron radiation light is high in brightness, so that the crystal structure may be analyzed in more details. The results of Example 1-1 and Example 2 are respectively shown in FIG. 7 and FIG. 8. As shown in FIG. 7 and FIG. 8, it was confirmed that the crystal phase having Argyrodite structure were stably present at 200° C. and 400° C. as well.

(Li ion Conductivity Measurement)

The Li ion conductivity at 25° C. regarding the sulfide solid electrolyte material obtained in Examples 1-1 to 1-6, and 2, and Comparative Examples 1-1 to 1-3, 2, and 3 were measured. First, the sulfide solid electrolyte material was weighed so as to be 200 mg, put in a cylinder made of macole, and pressed at 4 ton/cm² pressure. The both sides of the obtained pellet were pinched with pins made of SUS, and applied a restraining pressure by bolting, to obtain an evaluation cell. The Li ion conductivity was calculated by an alternating current impedance method while maintaining the evaluation cell to be 25° C. Solartron 1260 was used for the measurement with applying voltage: 5 mV and measuring frequency range: 0.01 to 1 MHz. The representative result is shown in Table 1.

TABLE 1

| | Li ion conductivity (S/cm) |
|---|---|
| Example 1-2 | $2.54 \times 10^{-4}$ |
| Example 1-3 | $2.43 \times 10^{-4}$ |
| Example 1-5 | $2.19 \times 10^{-4}$ |
| Example 1-6 | $2.36 \times 10^{-4}$ |
| Comparative Example 2 | $1.26 \times 10^{-8}$ |
| Comparative Example 3 | $3.16 \times 10^{-9}$ |

As shown in Table 1, high Li ion conductivity of $10^{-4}$ S/cm or more was obtained in Examples 1-2, 1-3, 1-5, and 1-6. In contrast, the Li ion conductivity in Comparative Examples 2 and 3 was low. Incidentally, in Comparative Examples 1-1 to 1-3, as described above, the peaks of the crystal phase having Argyrodite structure did not appear although the peaks of $Li_2S$, $Li_4SiS_4$ and $Li_5AlS_4$ appeared; thus, the Li ion conductivity was low similarly to Comparative Examples 2 and 3.

Reference Example

A sulfide solid electrolyte material was obtained in the same manner as in Example 1-1, except that "x" in $Li_{(4+x)}Al_xSi_{(1-x)}S_4$ was changed to "x"=0, 0.05, 0.08, 0.10, 0.12, 0.2, 0.3, 0.4, 0.5, 0.6, 0.7, 0.8, 0.9, and 1.

Figure 9:
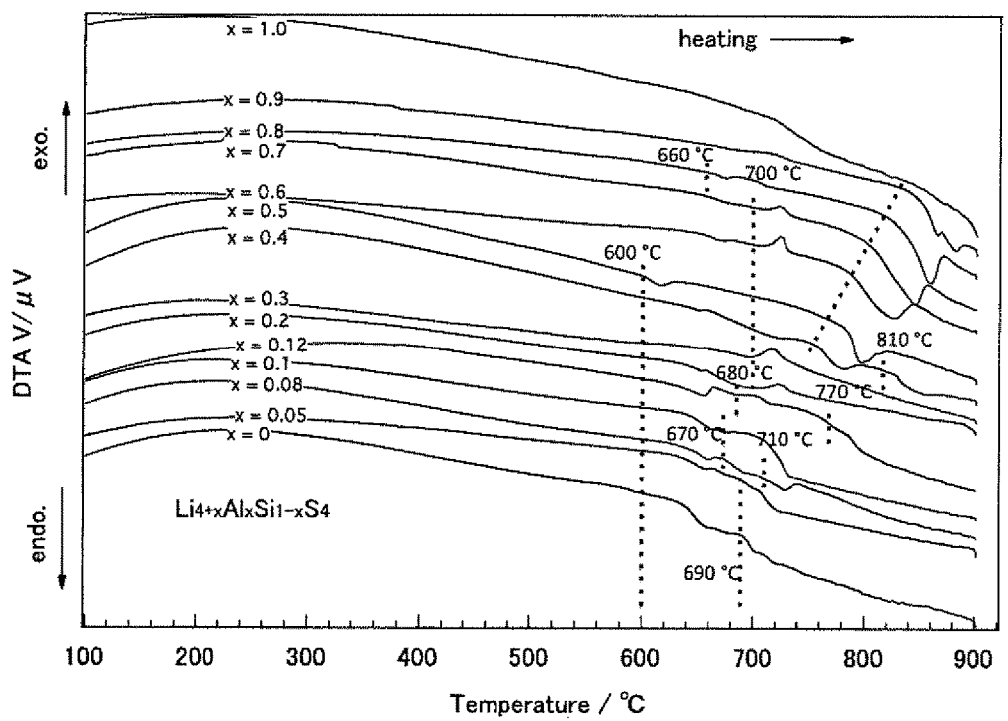
FIG. 9 is the result of DTA for the sulfide solid electrolyte material obtained in Reference Example.
Figure 10:
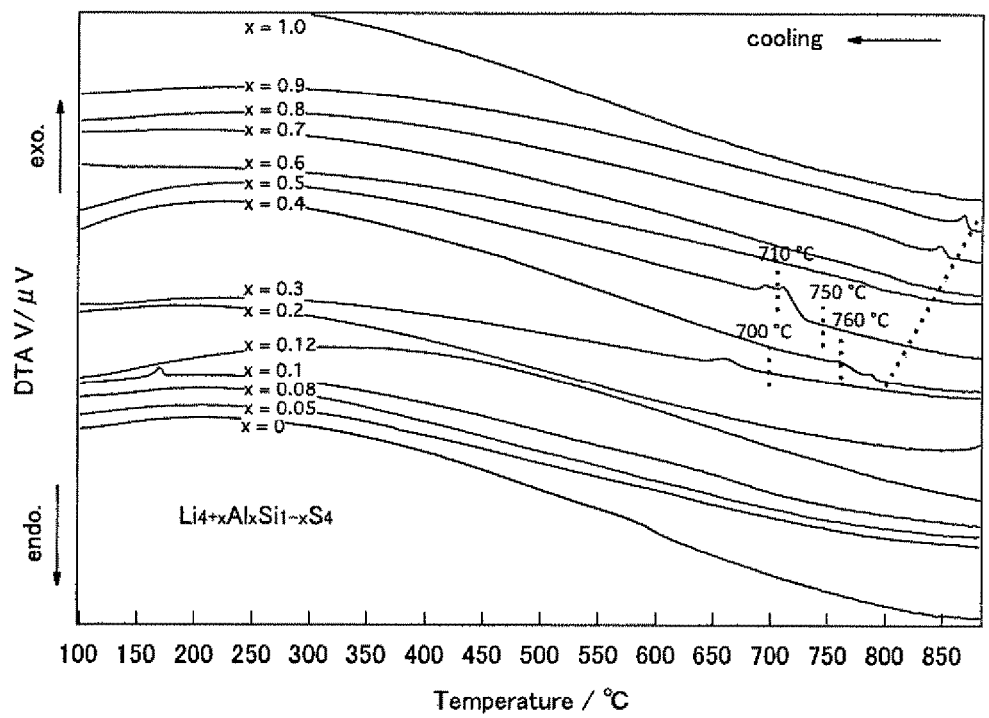
FIG. 10 is the result of DTA for the sulfide solid electrolyte material obtained in Reference Example.

Differential thermal analysis (DTA) was conducted for the obtained sulfide solid electrolyte material. The results are shown in FIG. 9 and FIG. 10. As shown in FIG. 9 and FIG. 10, it was confirmed that the obtained sulfide solid electrolyte material was stable until at least 600° C. The reason therefor is presumed to be that the element (particularly the Si element) contained in the sulfide solid electrolyte material is high in chemical stability.

REFERENCE SIGNS LIST 1 cathode active material layer
2 anode active material layer
3 electrolyte layer
4 cathode current collector
5 anode current collector
6 battery case
10 battery

What is claimed is:

1. A sulfide solid electrolyte material comprising a composition of $Li_{(4+x)}Al_xSi_{(1-x)}S_4$, wherein 0<x<1 is satisfied, and having a peak at a position of 2θ=25.19°±1.00°, 29.62°±1.00°, 30.97°±1.00° in X-ray diffraction measurement using a CuKα ray.

2. The sulfide solid electrolyte material according to claim 1, wherein the sulfide solid electrolyte material has a further peak at a position of 2θ=15.34°±1.00° in X-ray diffraction measurement using a CuKα ray.

3. The sulfide solid electrolyte material according to claim 1, wherein the peak at the position of 2θ=25.19°±1.00°, 29.62°±1.00°, 30.97°±1.00° is a peak of a crystal phase having Argyrodite structure.

4. The sulfide solid electrolyte material according to claim 1, wherein 0.08≤x<1 is satisfied in the composition.

5. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer, and the electrolyte layer contains the sulfide solid electrolyte material according to claim 1.

6. A producing method for the sulfide solid electrolyte material according to claim 1, the method comprising:
a preparing step of preparing a raw material composition containing a constituent of the sulfide solid electrolyte material, and
a heating and quenching step of heating and quenching the raw material composition.

* * * * *